Nov. 13, 1923.
G. H. S. McNAIR ET AL
1,473,913
METHOD OF PROJECTING IMAGES AND APPARATUS THEREFOR
Filed April 26, 1921   4 Sheets-Sheet 4
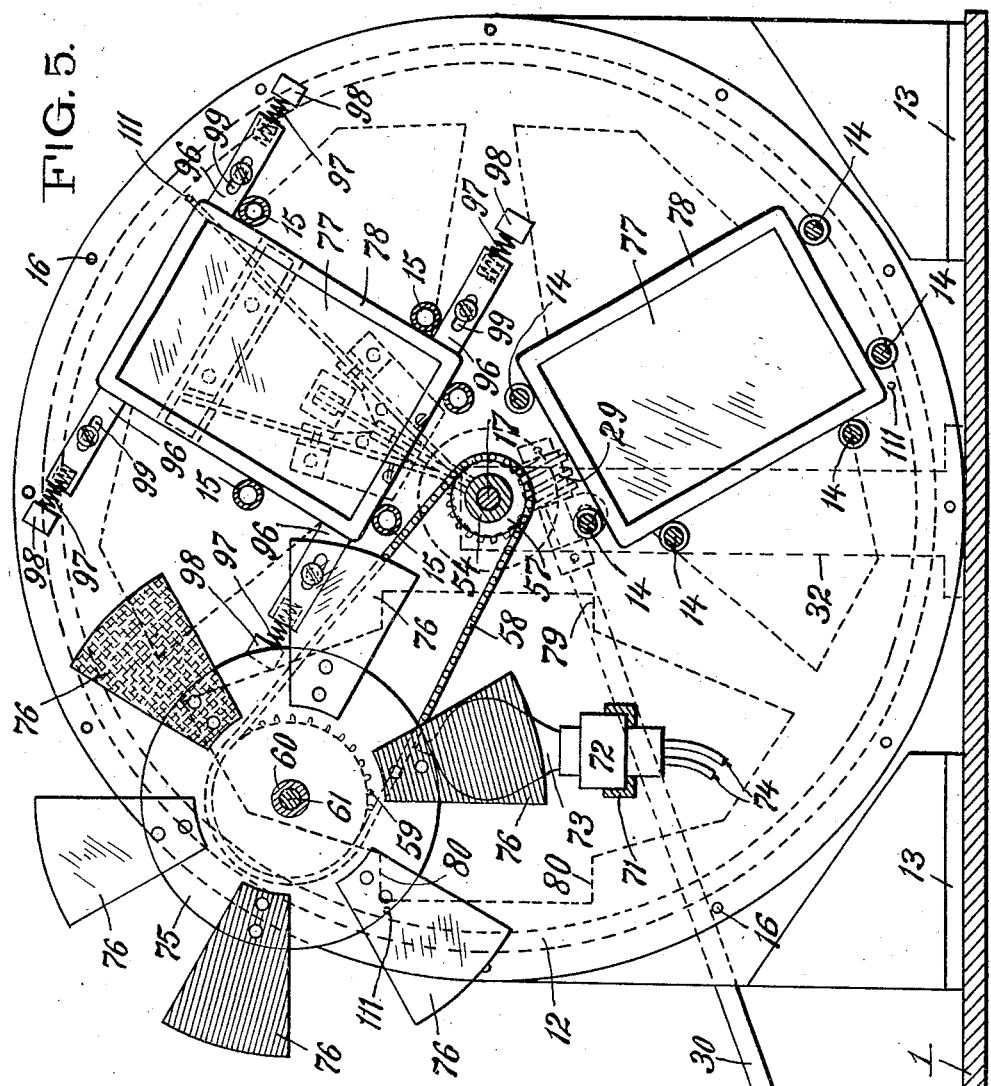
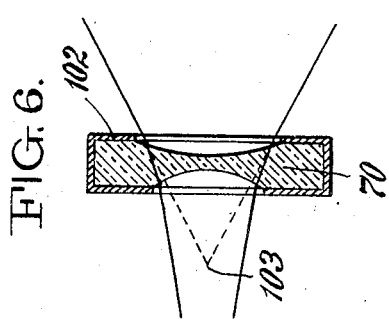
Inventors
George H. Stanser McNair
Hugh N. de L. McNair
Claude T. Siebs
By their Attorney
Seward Davis Patented Nov. 13, 1923.

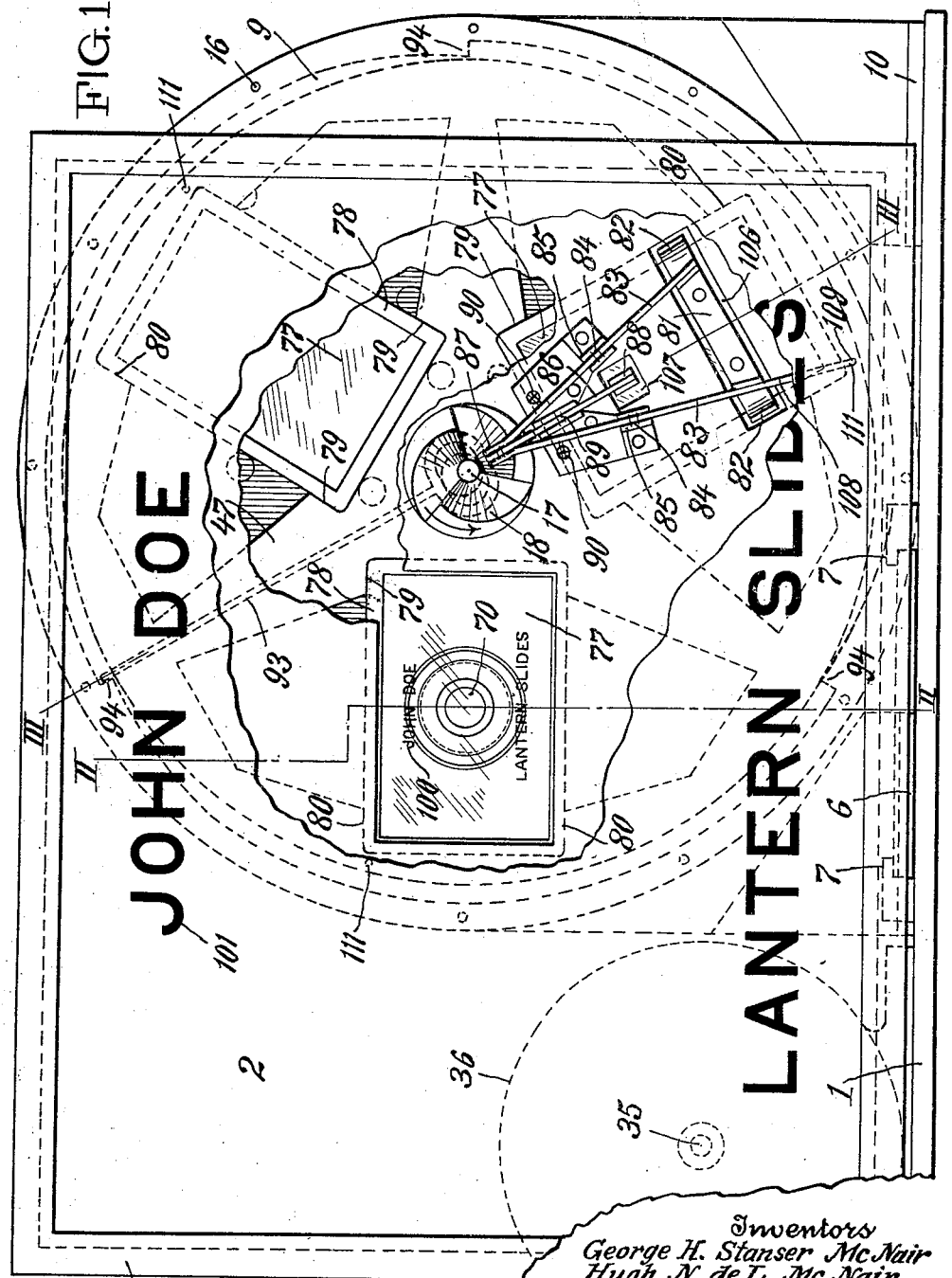

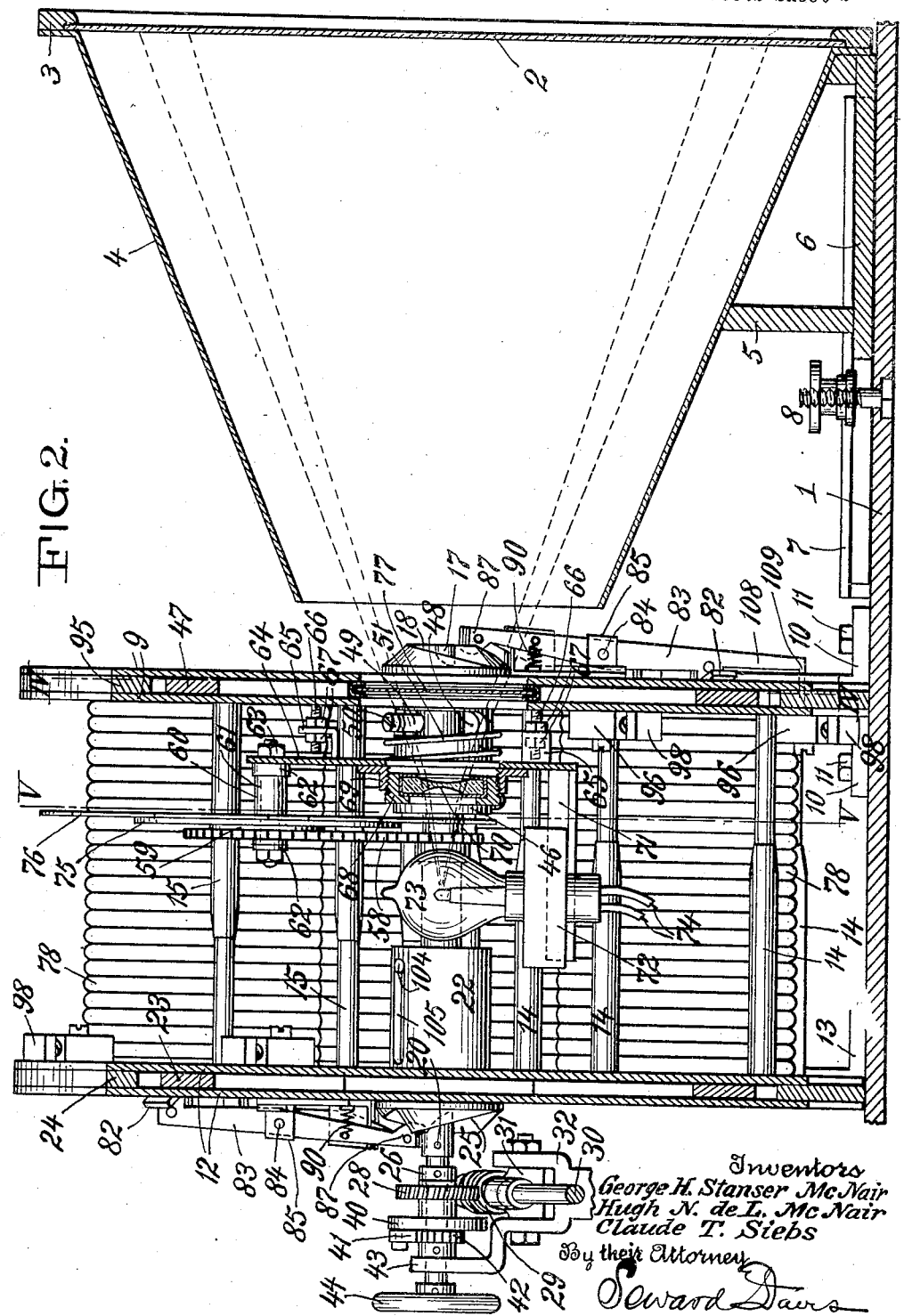

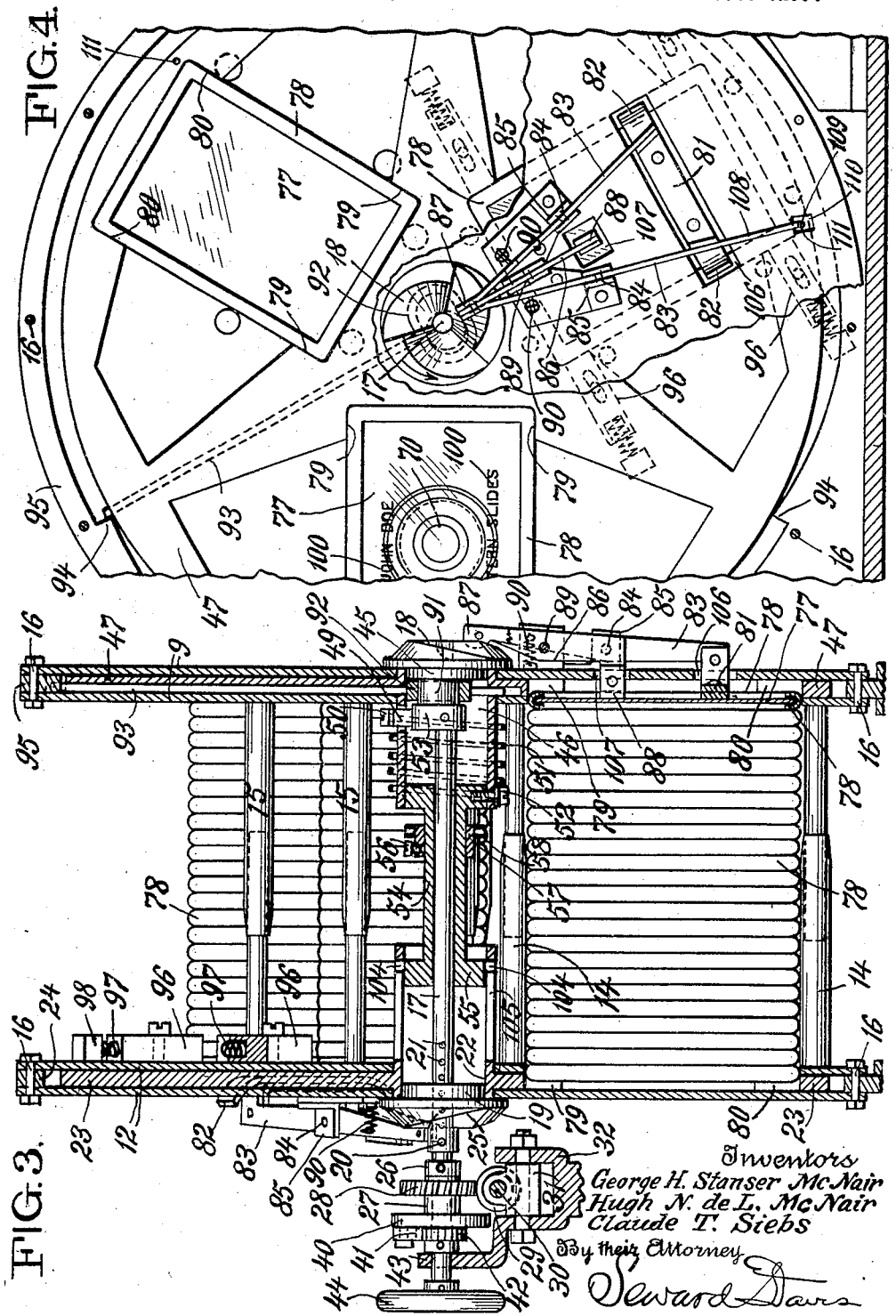

1,473,913

UNITED STATES PATENT OFFICE.

GEORGE H. STANSER McNAIR, HUGH N. DE L. McNAIR, AND CLAUDE T. SIEBS, OF NEW YORK, N. Y.

METHOD OF PROJECTING IMAGES AND APPARATUS THEREFOR.

Application filed April 26, 1921. Serial No. 464,582.

*To all whom it may concern:*

Be it known that we, GEORGE H. STANSER McNAIR, a citizen of the United States of America, HUGH N. DE L. McNAIR and CLAUDE T. SIEBS, subjects of the King of Great Britain and Ireland, all being residents of the city and State of New York, have invented and discovered certain new and useful Improvements in Methods of Projecting Images and Apparatus Therefor, of which the following is a specification, reference being made therein to the accompanying drawings, forming a part thereof.

This invention relates to a method of projecting a magnified, erect image substantially without loss of definition upon a screen by means of a single lens or the optical equivalent thereof interposed between the source of light and the transparency carrying the image to be projected.

It further relates to an apparatus adapted to the practice of such method and automatically to interpose a continuous succession of such transparencies and to retain each transparency stationary for the predetermined interval of projection.

It further relates to means adapted to display the projected images in successively changing colors and to other features of construction hereinafter more particularly described.

Our invention has for its objects the production of a compact, self-contained picture-projecting advertising machine which, by utilizing the novel method of projection by means of a single lens, will produce the degree of magnification desired, and will display the projected image upon a screen forming a part of said machine itself, a result heretofore attainable only by a series of lenses and a distant screen.

It has for its further objects the provision in such a machine of a magazine feed adapted to be continuously operated to present the transparencies successively in endless procession, and to permit their display upon such screen in a sequence of contrasting colors for predetermined intervals.

Further minor objects of invention are recited below and are attained by the structural embodiment of the preferred form of our apparatus illustrated and to be next described.

Our invention consists primarily in the discovery of the applicability of a lens of the divergent class commonly termed double or bi-concave, or concavo-concave to the utility of magnification for the purpose of direct projection. By associating a lens of this class with a light source in an optical projector, the source of light is caused to approach optically the illuminated side of the lens and is apparently reduced to approximate a point at the virtual or imaginary focus thus established. The rays emanating as if from this reduced source, having been dispersed by refraction at the concave surfaces of the lens, emerge at a comparatively wide angle of divergence. These rays pass through the transparent screen containing the image to be projected and fall upon the translucent screen, distant, say, six inches from the transparency, forming the projected image thereon erect, magnified, free from material distortion, and substantially without loss of definition. The degree of magnification thus resultant within, say, a six-inch over-all dimension from transparency to screen, and approximately a nine-inch over-all dimension from light to screen, is identical with that heretofore attainable only by use of condensing and projecting lenses with an over-all dimension from light to screen of four feet.

Secondarily, our invention consists in the compact, self-contained apparatus, adapted to practice our novel method of projection, in association with the elements essential thereto, namely, a light source, a lens, a transparency, and a screen.

Thirdly, our invention consists in the application of this method in association with the elements aforesaid to an apparatus adapted for use as a display device for advertising purposes, which apparatus is adapted to contain any desired number of transparencies and to display same in endless succession by means of an intermittently rotating carrier and magazines associated therewith and with a source of power for rotating said carrier.

Fourthly, our invention consists in the preferred form of its structural embodiment shown in the drawings, by which accurate registration of the slides with the several feeds is secured, the travel of the transparencies through the magazines is stabilized, their positions of rest are positively established, and which structure is composed of removable parts as to its essential elements which are themselves provided with adjustment devices, the whole structure being adapted to variable adjustments corresponding to the number of transparencies to be displayed.

The foregoing objects and others, as hereinafter disclosed, are attained by the construction and arrangement herein set forth and described and shown in the accompanying drawings, in which:

Figure 1 is a front elevation of the apparatus adapted for use as an advertising device, part of the screen being broken away to show the rotating carrier, a part of whose casing is likewise shown in turn as broken away to show underlying parts, indicated elsewhere by broken lines. Figure 2 shows a side elevation in section upon the broken line II—II of Figure 1. Figure 3 shows a side elevation in section upon the line III—III of Figure 1, part of the base and the screen being omitted. Figure 4 shows a front elevation in section upon the line IV—IV of Figure 2 of a portion of the rotating carrier at a position approximating a one-quarter revolution thereof, that portion of the casing being retained on which is mounted the means for transversely moving the transparencies as received from the carrier after exposure, associated parts being shown in dotted lines. Figure 5 is a vertical sectional view on the line V—V of Figure 2, viewed from the front. Figure 6 is a diagrammatic view of the lens optically considered with relation to the refraction and divergence of a pencil of light.

Like reference numerals indicate like parts throughout the several figures, in which 1 is a base on which is mounted the translucent screen 2, preferably of ground glass, 3 being its frame and 4 its shadow-box, supported by the wall 5 upon a floor 6 adapted to slide upon the base beneath the guides 7. The floor 6 is adapted to be clamped by the screw nut 8 to hold the screen at its adjusted distance from the two-part front casing 9 of the apparatus which is held fixed to the base by the angle brackets 10 by bolts 11. The two-part rear casing 12 is supported by bracket 13 which is movable relatively to the base. The casing members are connected by telescoping rods 14, 14 and 15, 15, oppositely disposed as to their telescoping function, for reasons hereinafter to be explained. The casing members are secured together by bolts 16. A main shaft 17 centrally disposed and parallel to the rods 14, 15, carries at its front end a three-step cam face 18 adapted to be continuously rotated with said shaft, which is supported adjacent its rear end by a disc or flange 19 having a cylindrical extension secured to said shaft by a pin 20, or which may be feathered thereto, if preferred, which pin engages one of a series of pockets 21 in said shaft to permit of its being moved along the shaft for adjustment, as hereinafter explained. This flange 19 is journaled in a cylindrical bearing 22 integral with and constituting the hub of a three-spoked wheel 23 rotating between the members of the two-part rear casing, which are spaced apart by the annulus 24. Integral with this disc or flange 19 and between it and its cylindrical extension is a second three-faced cam 25. An extension of the shaft, 17, has a sleeve 26 fixed thereon acting as a stop face for a sleeve 27 freely rotating on said shaft. The sleeve 27 carries a gear 28 meshing with a worm 29 upon a second shaft 30 supported by a bearing 31 upon a pedestal 32. The other end of the shaft 30 carries a gear 33 meshing with a worm 34 upon the shaft 35 of a motor indicated conventionally in Figure 1 as 36. The shaft 30 is suitably supported beyond the gear by the adjustable bearing 37 pivoted at 38 in the thrust block 39 mounted upon the base. The sleeve 27 has a flange 40 carrying a pawl 41 engaging the ratchet wheel 42 pinned to the shaft and imparting rotation thereto in one direction of revolution. An extension 43 of pedestal 31 forms a bearing for the shaft extension which is terminated by the hand-wheel 44 adapted to permit manual revolution of the shaft for setting or manual operation of the device when desired.

The front end of the shaft 17 is supported by a flange 45 journaled in a cylindrical bearing 46 supported by the members of the front casing. This bearing is the hub of a three-spoked wheel 47, whose spokes are radially disposed in correspondence with those of the rear wheel 23. The cylindrical bearing 46 is axially alined with the shaft 17 and is slotted at 48 (see Figure 2) to receive a post 49, to which is secured by the screw 50 one end of a spring 51 coiled about the bearing and having its other end secured to said bearing by the screw 52. The post 49 is mounted upon an eccentric flange 53 fixed on the shaft 17. (See Figure 3.) A central prolongation 54 of the hub forms an intermediate journal for the shaft. This prolongation is of reduced diameter but is enlarged at its end to form a circular flange 55 slidably fitted to the interior of the cylindrical bearing 22 to permit adjustment of depth of the apparatus, and having driving lugs 104 projected into horizontal slots 105 in said bearing whereby it is caused to rotate with the bearing 46. The journal 54 forms a sleeve upon which is fixed by the screw 56 a sprocket wheel 57 adapted to rotate with the cylindrical bearings and with the wheels of which they constitute the hubs, with an intermittent, step-by-step motion. If preferred, the sprocket may be keyed to the shaft and turned continuously therewith, as will be obvious. This sprocket wheel 57 drives by the chain 58 the wheel 59 having a bearing 60 rotating on the axle 61 and turning between the washers 62, the axle being held by the bolts and nuts 63 to a supporting frame 64. This frame is held to the inner member of the front casing by brackets 65, threaded studs 66, and clamping nuts 67. The frame 64 is centrally apertured to permit the mounting therein of a lens frame 68 adapted to be screwed therein by threaded engagement with the annulus 69. This frame 68 carries a double concave lens eccentrically disposed relatively to the axis of the main shaft. The frame 64 also has two horizontal extensions 71 constituting guides adapted to receive the base 72 of an electric lamp 73 whose filament is focally alined with the axis of the lens 70. The current leads 74 of the lamp are shown as broken away, their connection to a lighting circuit being a matter readily understood. The lamp and its mountings are thus removably mounted and constitute an independent element structurally. Similarly, the lens is, as explained, a unit readily removable with its mounting.

The wheel 59 is rigidly secured to a disc 75 carrying the wings or color screens 76 of translucent material, such as celluloid. These wings, as shown, are six in number, blue, red and yellow being alternated with white or colorless wings, but it will be obvious that by increasing the ratio between the sprocket wheels, the number may be increased or a continuous disc employed with alternated colors thereon. The arrangement shown is such that these wings or color screens are successively interposed between the lamp and lens.

77 are transparencies or slides upon which are the images or legends to be projected. These transparencies are mounted in suitable frames 78 which are supported in parallel relation upon and between the rods 14 and 15, the carrier wheels being recessed and cut away at spokes and felloes, as at 79, 80, to form rectangular pocket spaces corresponding to the depth and dimensions of the frames, the inner casing parts being correspondingly apertured to register with these pockets.

81 is a flat plate having upwardly curving extensions 82. This plate is adapted to be pressed through a cut-away portion 106 of the front casing against the outermost member of a stack of transparencies or slides, as in Figure 1, by means of forking lever arms 83 attached thereto and pivotally fulcrumed at 84 upon a bracket 85 fixed to the outer member of the front casing. The central or inward extension of the levers beyond the point of support form with a like extension of a second lever arm 86, a finger 87 adapted to engage the face of the cam 18. The said lever arm 86 has at its outer end a short plate 88 with upcurving ends adapted to extend through the slot 107 in the front casing to engage a slide. This lever arm 86 is pivotally fulcrumed at 89 and together with the arms 83 is held against the cam face by springs 90. One of the forking lever arms 83 of the pair shown at the front, and similarly one of the pairs shown at the back, has an extension 108 terminated by an inwardly projecting tooth 109 adapted to pass through an orifice 110 in the casing and engage a hole 111 in the carrier wheel 47, this being the release control means whose disengagement permits rotation of the wheel carriers when the locking rod 93 has been first disengaged from the stop upon the annulus interposed between the members of the two-part front casing. There are three of these holes in the carrier wheel, corresponding to the stop faces on the annulus and their relative positions. A like arrangement of lever arms, plates, springs, finger and release control means is provided at the back of the apparatus, being mounted there on the outer member of the two-part casing for similar purposes with relation to the stack of slides in the upper magazine, as more fully detailed in describing the method of operation.

Upon the shaft 17, between the bearing flange 45 and the eccentric flange 53 is an eccentric cam 91 engaging with which cam is an elliptical collar 92 carrying the locking rod 93 in a recess in one of the spokes of the front carrier wheel. This rod 93 is adapted to engage the stop faces 94 on the annular spacing member 95 interposed between the two parts of the front casing, rotation of the shaft 17 causing the wipe of the moving cam 91 on the collar or yoke 92 to draw the rod 93 radially inward at regulated intervals and, conversely, the wipe of the moving yoke on the cam during the period of motion of the carrier wheel causing the thrust of the rod 93 radially outward into proximity with the member 95 and the stopping of the carrier thereby when the next face 94 is encountered.

96, 96 are two pairs of steadying or friction fingers mounted upon the inner faces or the inner members of the double casings at the front and rear adjacent the magazine openings in the casings, and movably secured thereto by screws. The opposed pairs of fingers are pressed toward each other by the compression springs 97, 97 which bear against the butts 98, 98, play being afforded relatively to their securing screws by the slots 99, 99.

100 is the image upon the transparency in projecting position in front of the lens, and 101 is the projected image, shown in the illustration as a legend.

102 is a shutter element fixed upon the lens to prevent the passage of light rays through portions of the glass adjoining the lenticular surfaces.

Figure 6 diagrammatically represents the theoretical divergence of rays from a light source resulting in the establishment of a virtual focus or imaginary light source at 103.

The method of operation of the apparatus shown and described is as follows:

The magazine spaces formed between the inner members of the double casings by the telescoping cross-rods therebetween are filled with transparencies, assuming that there are no slides in the projector. These transparencies or slides may be introduced into the upper of the two magazines from the top, as appears in Fig. 5, in which are shown the five rods so located as to support the slides from three sides, permitting their insertion in this magazine in a radially inward direction. The lower magazine may be filled from the side, as appears in Fig. 5, the transparencies therein being supported upon three sides by these rods. An equal number of slides is placed in each magazine, and the rear casing is then moved toward the front casing until the slides are pressed together thereby and vertically positioned in their magazines in mutual contact. The slides now form two stacks extending continuously between the outer members of both front and rear casings. One slide is now subtracted from the stack in each magazine, the space thus left vacant representing the operative condition of a vacancy in each outgoing or delivery pocket of each carrier, the incoming or receiving pocket of each carrier containing a slide to be acted upon as next explained. The same condition may be attained without removal of slides by retracting the rear casing the width of one slide, as will be obvious. The shaft is then manually rotated by the handwheel provided for the purpose in the direction shown by the arrow, causing the shaft to turn in a counter-clockwise direction. As viewed in Fig. 1, the turning of the shaft causes the short arm of the pivoted levers to ride upward toward the high point of the particular cam face with which it is engaged, and thereby the long arms are depressed and the presser plates or fingers carried thereby are caused to pass through the casing slots and to contact with the slide adjacent thereto. As the revolution of the shaft continues, these slides are caused to travel in horizontal paths, those in the lower magazine toward the rear, and those in the upper magazine toward the front. This travel continues until the member of the stack in the lower magazine adjacent the rear casing is thrust outward and into the recess in the rear wheel provided to receive the same. Similarly, as to the upper magazine, the last member of its stack adjacent the front of the machine is urged forward and outward by the action of the presser fingers, motion being communicated thereto through the other members of the stack until the slide enters the recess or pocket provided therefor in the front wheel. The front wheel now has a slide in its upper pocket and the rear wheel has a slide in its lower pocket. At this point, the lever contacting with the cam face drops from the high point to the low point of the next of the three cam faces thereon, the lever arms are retracted by the spring, the presser fingers are lifted out of the planes of the wheels, and the release control is disengaged. Just before the withdrawal of the presser fingers from the wheel planes, the eccentric cam upon the shaft causes the retraction of the locking rod, so that it is clear of engagement with the stop face or tooth upon the frame engaged thereby, as shown in Fig. 4. This locking rod serves the purpose of stopping the rotation of the carrier wheels at the stations appointed, while the release means 108, 109 and 110, function to control the starting of the carriers after the locking rod has been disengaged. But one locking rod has been shown. A second rod similarly operated may be mounted upon the outer member of the rear casing in association with a cam upon the shaft, all in duplication of arrangement of that shown at the front and adapted to function synchronously therewith.

On retraction of the tooth 109 from the orifice 110, the wheels are free to rotate, being urged forward by the stored-up energy of the coiled spring, which has been stressed during the preceding period of revolution of the shaft, during which the arm of the pivoted levers rode upward on the cam face. The wheels being released and free to revolve under the force of the spring connected to their hubs, abruptly turn one-third of a revolution, being stopped by the engagement of the locking rod with the next stop face upon the frame with which it engages by virtue of the fact that such rod is thrust radially outward by the yoke which is caused to ride upon the high point of the cam by the rotation of the carrier wheel, which carries said yoke, relatively to said cam.

Now considering the front wheel, it will be seen that the slide received by it from the upper magazine has now advanced 120 degrees and is positioned in alinement with the light and lens, and its image will be projected upon the screen. No slide having previously been in projected position, that pocket of the front wheel is empty, but has simultaneously advanced 120 degrees and is in alinement with the stack of slides in the lower magazine, and is now acted upon by the presser fingers in the manner previously described. The pocket in the wheel opposite the lower magazine, which was emptied by the action of the presser fingers, as above described, has now advanced 120 degrees and is opposite the upper magazine and ready to receive another slide therefrom. Under these conditions at starting, it is necessary to supply to the lower magazine by hand one slide to make up for the first delivered by it, none having been received by it from the pocket that originated at the display station. This completes the complement of the magazines, and of the pockets, the front wheel having two pockets filled, and the rear wheel having one pocket filled, during rotation.

Considering the action of the rear wheel: The slide received in the pocket thereof in register with the lower magazine, has now been carried forward 120 degrees and is in register with the upper magazine, to which it is now delivered by virtue of the action of the presser fingers, as previously described. The pocket which was opposite the upper magazine and from which was delivered, by the action of the presser fingers, the slide held therein, as previously described, has now advanced 120 degrees and is in an idle or empty position midway between. The recess intermediate these two, and which was empty in the idle position, has now advanced 120 degrees and is positioned opposite the lower magazine, and ready to receive the slide to be advanced thereto by the action of the presser fingers at the opposite end of its stack. Thus the rear wheel has one pocket filled during periods of rotation.

In the foregoing description it will be understood that the travel of an individual transparency or slide is from the exposure pocket on the front wheel one-third of a revolution to the lower magazine, horizontally through the lower magazine to the rear wheel, upward one-third of a revolution with the rear wheel to the upper magazine, horizontally therethrough to the front wheel, and from there one-third of a revolution to the projected position.

When the manual manipulation has served to place a transparency in the projecting position, current is turned upon the lamp and the lamp is adjusted to secure the maximum of display of the projected image which the screen's area will permit, and the screen is adjusted to center the projected image thereon. Thereupon the motor is started and the machine operates automatically, causing the transparencies to travel upon their appointed paths and to be successively and continuously projected in repeated cycles.

In the device described, the distance from screen to light is about nine inches, and from screen to transparency just six inches, and the time of exposure of each transparency is 10 seconds. It is to be observed that with the class of lens described, no focusing is necessary. With the arrangement of color screens shown, the drive being synchronous with the rotation of the wheels, that is, step-by-step, alternate images are projected in color, the intermediate pictures being shown without color; but, as heretofore explained, the drive may be direct from the main shaft and synchronous therewith, so that each projected image may be shown in one or more colors, as desired.

It is to be noted that by cutting away the spokes of the wheels in the manner indicated in dotted outlines in Figs. 1 and 5, and to a depth equal the depth of a slide, clearance is afforded during the interval required for the withdrawal of the presser fingers from between the spokes of the wheel and out of the plane thereof through the openings in the casing. It will also be noted that the steadying fingers on the inner walls of the casing,—at the rear in the case of the upper magazine and at the front in the case of the lower magazine,—have an important function in holding the received slide in erect position and in contact with its neighbor pending the delivery of the next slide. The movement of the stacks in the two magazines is along and between the telescoping rods by which they are supported. The arrangement of telescoping of these rods is reversed in the two magazines, the outer member receiving the inner member in the direction of line of travel of the stacks, which are moved forward uniformly a distance equal to the width of one slide for each third of a revolution of the wheel. Thus the slide at the forward end of each stack is picked up by the wheel and the slide at the rearward end is moved forward so as to clear the wheel and is held in position by the steadying fingers, as described, during the periods of rotation.

Photically considered, the preferred source of light is an incandescent lamp having the type of filament employed in lamps commerically termed auto-headlight lamps, of 32 candle power and from 6 to 8 volts, but any type of lamp may be used with good results, which has a short filament, the criterion being that the light emanating source shall be of point-like character, and that the lumens per square millimeter be not sacrificed.

Optically considered, the preferred form of divergent lens which we have employed is of flint glass having a refractive index of 1.62 ground on one side to a radius of 11 millimeters and having a diameter of lens opening of 11 millimeters; ground on the other side upon a radius of 25 millimeters and having a diameter of lens opening of 18 millimeters; and a thickness of glass at the optical center of one-half millimeter. The lens employed, may, however, range within the following limits with practical results.

When the lens is outside the incandescent lamp bulb, the limits of practical concavo-concave lenses for our utility lie between one having equal radii of curvature of 5 millimeters and one having equal radii of curvature of 30 millimeters, or any values lying between these, whether the radii are equal or not.

If the lenses are placed, during manufacture, inside the incandescent bulbs, the useful values of the radii of curvature may be as small as 2 millimeters.

To insure the best definition, lenses should be constructed having a minimum practical thickness at the optical center.

Having thus described our invention, we claim:

1. In an optical projector, the combination of a light source, means adapted to refract the rays therefrom to a wide angle, said means consisting of a lens element of the divergent type, a transparency carrying an image whose outlines are adapted to be projected by the passage of said refracted rays through said transparency, and a translucent screen in alinement with said light source and transparency and adapted to receive the projected outlines of said image.

2. In an optical projector, the combination of a light source, means adapted to refract the rays therefrom to a wide angle, said means consisting of a concavo-concave lens, a transparency carrying an image whose outlines are adapted to be projected by the passage of said refracted rays through said transparency, and a translucent screen in alinement with said light source and transparency and adapted to receive the projected outlines of said image.

3. In an optical projector, the combination of a light source, a lens positioned adjacent said light source and adapted to reduce the apparent size of said source and to establish a virtual focus thereof between the lens and said source, a transparency carrying an image positioned adjacent said lens and adapted to receive the light passing therethrough, and a translucent screen adapted to receive the image projected by the light from said transparency.

4. In the art of optical projection, the method consisting in causing the rays from a light source to diverge, passing a part of said rays through a transparency, cutting off the remaining rays, and intercepting the rays which have passed through said transparency by a translucent screen adapted to receive a projected image.

5. In the art of optical projection, the method consisting in the following steps: interposing a double concave lens between a light and a transparency carrying an image to be projected, locating said image symmetrically with relation to the optical axis of said lens, cutting off the divergently refracted rays which are not cut by said transparency and adjusting a translucent screen adapted to receive the projected image in a plane at right angles to the optical axis of said lens and at such distance from the transparency as to receive all the rays projected therethrough.

GEORGE H. STANSER McNAIR.
HUGH N. de L. McNAIR.
CLAUDE T. SIEBS.